United States Patent [19]
Halverson

[11] 3,939,667
[45] Feb. 24, 1976

[54] FROZEN CARBONATED DRINK DISPENSING SYSTEM

[75] Inventor: Maynard L. Halverson, Seattle, Wash.

[73] Assignee: Sweden Freezer Manufacturing Co., Seattle, Wash.

[22] Filed: Sept. 9, 1968

[21] Appl. No.: 758,393

[52] U.S. Cl. .................. 62/188; 62/306; 222/129.1
[51] Int. Cl.² ......................................... A23G 9/20
[58] Field of Search.......... 222/146 C, 129.1; 62/69, 62/70, 306, 342, 188

[56] References Cited
UNITED STATES PATENTS

| | | | |
|---|---|---|---|
| 3,304,737 | 2/1967 | Strutynski | 62/306 X |
| 3,403,523 | 10/1968 | Bauer et al. | 62/70 |
| 3,460,713 | 8/1969 | Cornelius | 222/1 |
| 3,468,137 | 9/1969 | Welty | 62/306 X |
| 3,477,244 | 11/1969 | Scoggins | 62/306 |

*Primary Examiner*—Robert B. Reeves
*Assistant Examiner*—Frederick R. Handren
*Attorney, Agent, or Firm*—Seed, Berry, Vernon & Baynham

[57] ABSTRACT

A frozen edible product, commonly called "frozen slush", is produced in a pressurized $CO_2$ atmosphere from a liquid mix, consisting of carbonated water and flavored syrup, also produced in a pressurized $CO_2$ atmosphere. A liquid mix consisting of proportioned quantities of carbonated water and syrup is contained within a liquid mix reservoir and metered into a product freezing cylinder to maintain the product freezing cylinder charged to capacity under normal operating conditions.

7 Claims, 5 Drawing Figures

MAYNARD L. HALVERSON
INVENTOR.

BY

ATTORNEYS

MAYNARD L. HALVERSON

ATTORNEYS

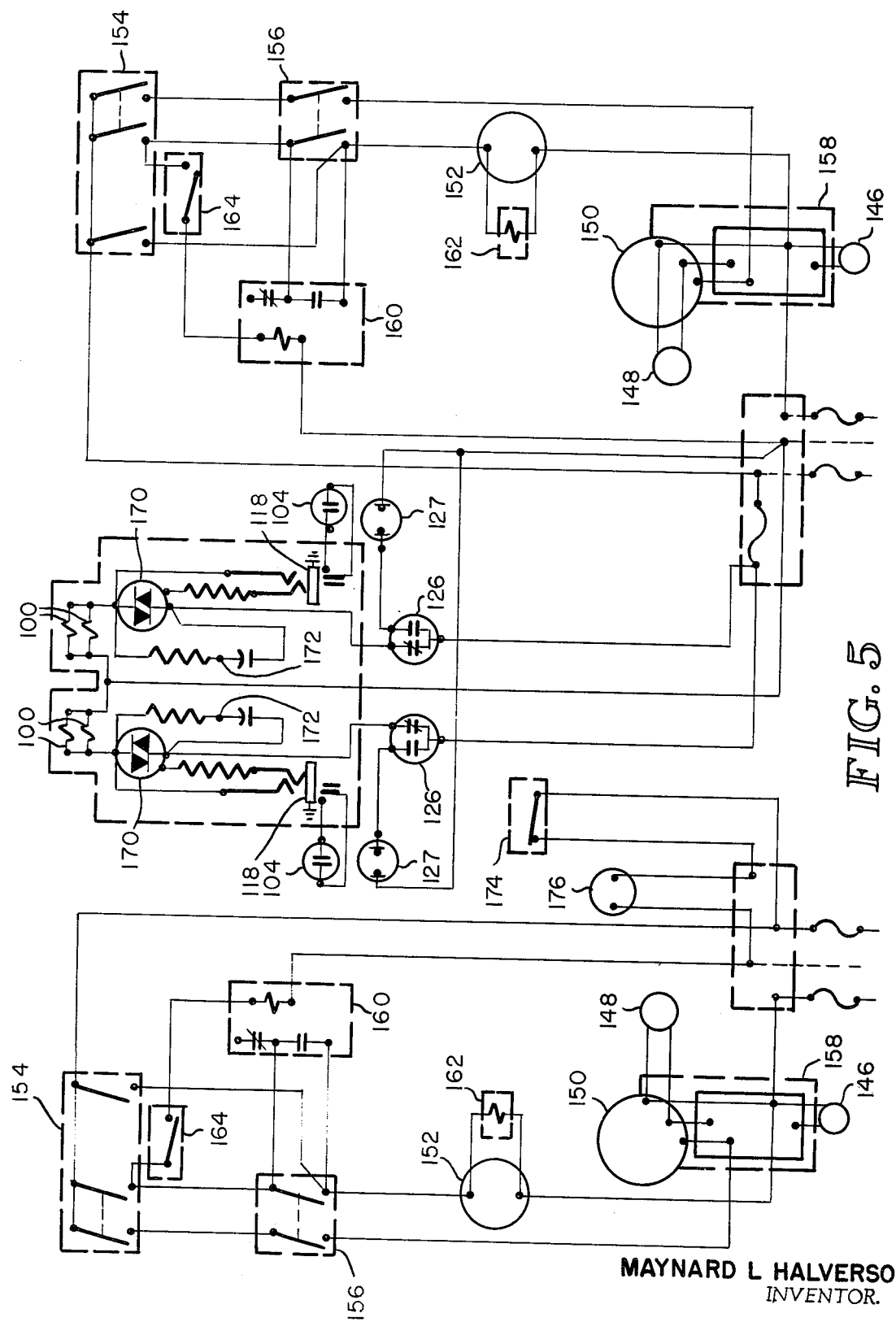

FROZEN CARBONATED DRINK DISPENSING SYSTEM

Frozen carbonated beverages—called frozen slush—are difficult to produce on a continuous basis due to the icy flake-like form of the product. Both the temperature of the end product and the ratio of carbonated water to flavored syrup must be closely controlled to achieve the desired product texture, consistency and flavor during periods when frozen product is being withdrawn from a body of frozen product and liquid mix is being simultaneously added to the body of frozen slush.

A primary object of the present invention is to provide a system for producing a frozen carbonated drink wherein frozen product may be made available on a continuous basis. Another object is to provide such a system wherein a body of prepared frozen product is pressurized by a $CO_2$ atmosphere to facilitate product withdrawal. A further object is to provide such a system wherein carbonated water and flavored syrup are automatically mixed in predetermined proportions and stored in a reservoir prior to addition to a product freezing cylinder, and wherein the reservoir is pressurized by a $CO_2$ atmosphere to inhibit deterioration of liquid mix contained therein. These and other objects and advantages will become apparent from the following description in conjunction with the accompanying drawings, of which:

FIG. 5 is an electrical schematic embodied in the system of this invention.

Figure 1:
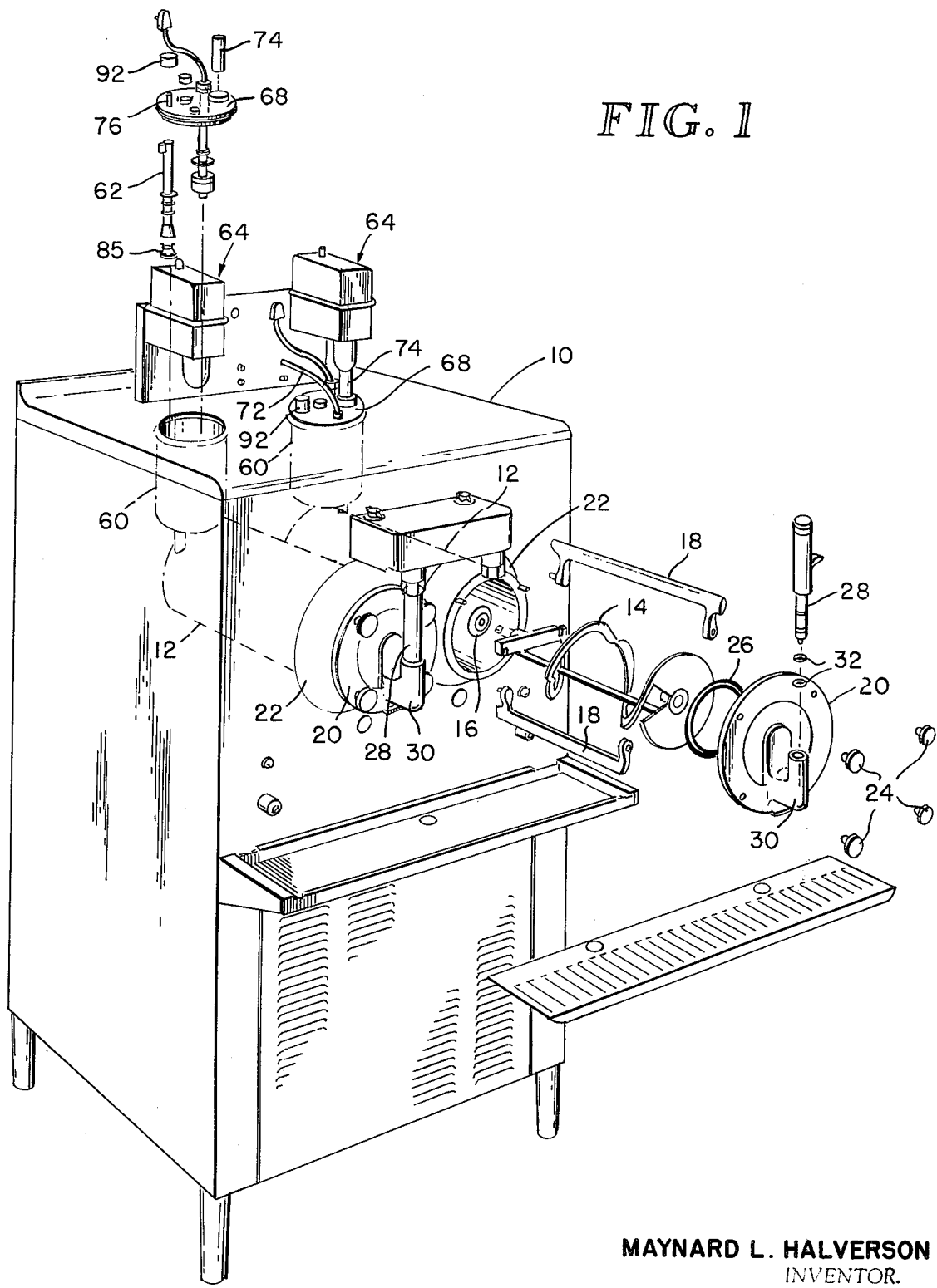
FIG. 1 is a perspective view of a double unit frozen carbonated drink dispensing apparatus of this invention.

In brief, the frozen carbonated drink dispensing apparatus of this invention comprises a product freezing and dispensing means from which the frozen product is drawn under pressure, and a product liquid mix supply means feeding carbonated liquid product mix under pressure to the freezing and dispensing means. The system of this invention also includes means providing a supply of carbonated water and syrup from which the liquid product mix is formulated, and means providing a supply of $CO_2$ for pressurizing the product. The system provides for the combination of carbonated water and syrup into a liquid mix, holding the mix in a $CO_2$-pressurized reservoir, and metering the pressurized liquid mix into a product freezing cylinder for conversion into a frozen slush, and for the withdrawal of the frozen slush product as required. Pressurizing the liquid mix reservoir and the product freezing cylinder serves a twofold purpose: firstly, better carbonation is obtained thereby affording a more desirable product; and secondly, the carbonated water-syrup combination is protected by an inert atmosphere thereby minimizing mold formation. This latter feature is particularly important where the system remains in an operative condition for an extended period —eg up to three weeks for example —with the mixed combination remaining static for extended periods—overnight for example. Pressurizing the freezing cylinder to at least about 2 psig. also provides superior product withdrawal.

Referring to FIGS. 1–4, the dispensing apparatus depicted is a double unit enabling the independent production of two frozen carbonated drink products. This apparatus comprises two product freezing and dispensing means and two product liquid mix supply means. Both units are housed within the case 10 as are the related electrical and refrigeration systems.

Each product freezing and dispensing means comprises a horizontal cylindrical pressure vessel 12 having a closed rear end and an open front end, a helical dasher 14 removably journalled to the rear end wall of the freezing cylinder 12 with a product pressure seal 16, a pair of freezing cylinder wall scraper blades 18—18, a product dispensing front flange 20 removably attached to a casing-mounted front rim 22 by thumb nuts 24 and journal mounting the front end of the dasher 14, an O-ring pressure seal 26 positioned against the inner face of flange 20, a mechanically-operated plunger type frozen product dispensing valve 28 mounted by a valve 28 mounted by a valve housing 30 on the flange 20 and ported into communication with the freezing cylinder interior, and a pair of O-ring pressure seals 32 mounted by the dispensing valve 28. The freezing cylinder 12 is insulated and ported for passage of a refrigerant therethrough. Suitable temperature controls, indicated in FIG. 5, are provided to regulate a refrigerant compressor to maintain a desired product temperature within the freezing cylinder.

Each product mix supply means comprises a pressurized mix reservoir 60, a mix metering valve 62, and a carbonated water and syrup dispensing assembly 64. The reservoir 60 is a pressure vessel having a closed bottom and an open top with a mix entry tube 66 extending from a port in the reservoir vessel bottom into the top of the respective freezing cylinder 12 at the rear thereof. The reservoir vessel open end is closed by a cover 68 that contains a peripheral O-ring pressure seal 70 adapted to bear against the vessel inner wall surface. Cover 68 is ported for entry of pressurized $CO_2$, and for entry of carbonated water and syrup, and for an exhaust vent. A $CO_2$ line 72 is connected to the cover $CO_2$ inlet port and a mix flow tube 74 is connected to the cover carbonated water-syrup inlet port. A short external vent tube 76 is mounted by the cover axially of the exhaust vent.

The mix metering valve 62 comprises an elongated valve stem 78 to the base of which is attached a hollow valve sleeve 80. Valve sleeve 80 is adapted to be inserted into the mix entry tube 66 and is provided with an external annular rim 82 adapted to seat on the mix reservoir bottom. The valve sleeve is provided with a metering port 84 through the wall thereof just above the rim 82 and with a pair of tube alignment rims 83. The lower portion of the sleeve is flared to provide a frusto-conical section which slightly protrudes into the freezing cylinder 12. A screened frozen product barrier 85 is fitted into the bottom of the flared sleeve lower end and held therein by upstanding locking tabs 87 that lock into locking holes 86 provided therefor in the sleeve lower end. The screened barrier comprises a base rim that contains a barrier screen 88 and abuts the end of the sleeve, and a frusto-conical upper end section 90 which slidably fits into the sleeve lower end.

A weighted pressure relief head 92 slidably fits over the end of the vent pipe 76 and is retained thereon by a coil spring 94. Spring 94 encloses a needle 96 that is attached to the relief head 92 and extends through the vent tube 76 and cover vent, the spring having a bottom tail inserted through the needle eye and bearing against the cover lower surface.

The carbonated water-syrup dispensing assembly 64 comprises solenoid-operated on-off type valves 100 that normally close off a syrup inlet port and a carbonated water inlet port to a discharge spout 102, and a reservoir mix level-sensing control switch 104 that effects actuation of valves 100. Switch 104 is a vertically-oriented normally-open reed switch contained within an elongated electrical lead casing 106 that extends vertically downward through the reservoir cover 68 into the reservoir. The casing slidably mounts a float 108 for axial movement between lower and upper limit stops 110 and 112. The float contains an annular switch-actuating permanent magnet 114. The lower stop 110 is positioned at the elevation of the metering port 84 and the upper stop 112 is located below the level of the upper end of the valve stem 78. The switch electrical leads extend out of the casing 106 into a cord 116 provided with a plug 118 adapted to be plugged into the control circuitry of the solenoid valves 100.

Figure 2:
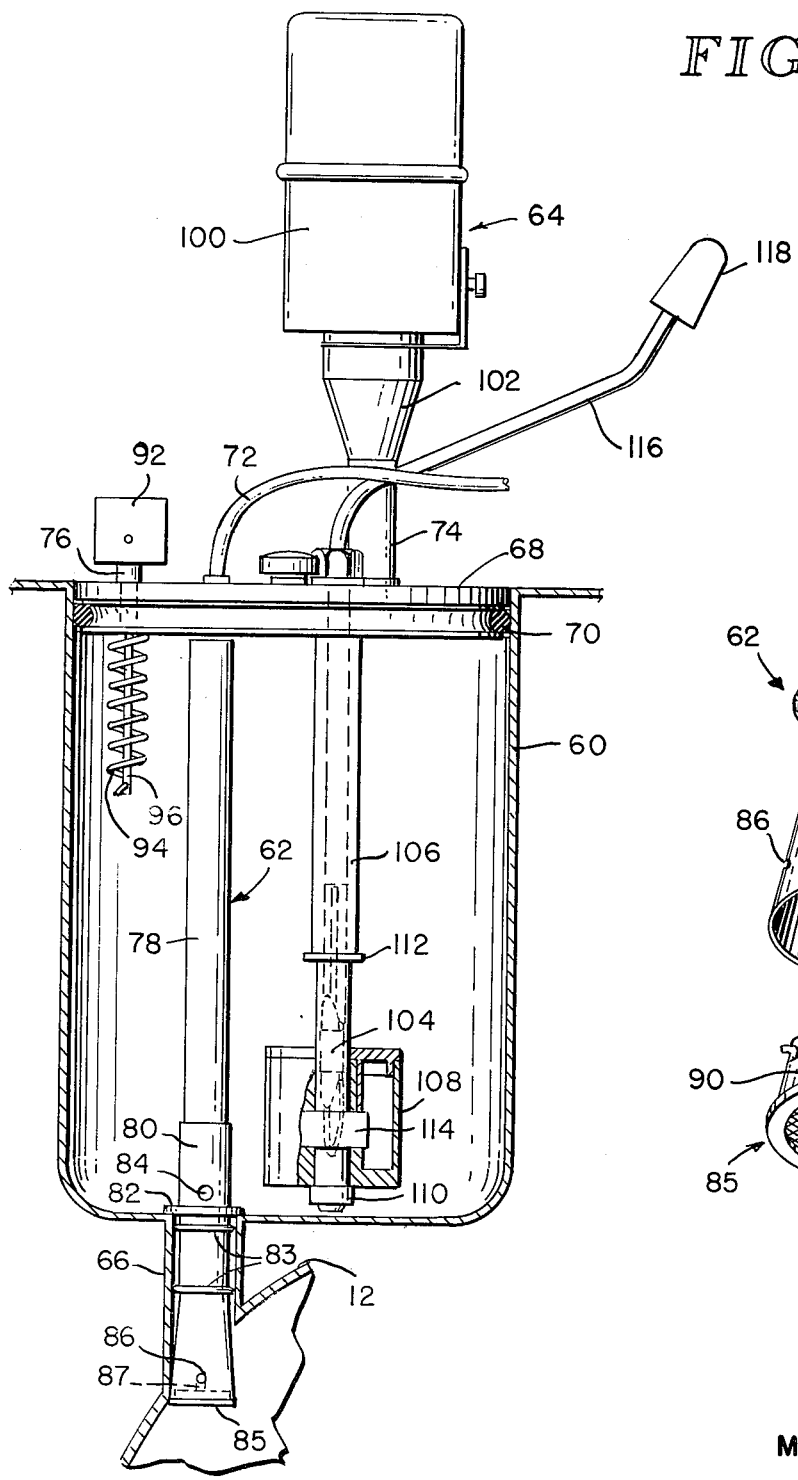
FIG. 2 is a detail view in elevation of a liquid mix reservoir incorporated in the FIG. 1 apparatus, and of a carbonated water-syrup dispensing assembly for charging the reservoir with proportioned amounts of carbonated water and syrup.
Figure 3:
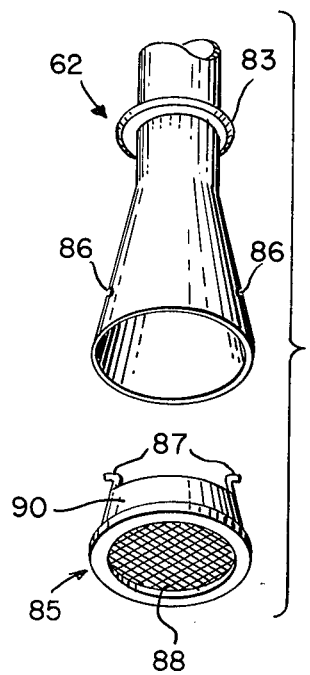
FIG. 3 is a detail view of a liquid mix metering valve for controlling entry of liquid mix from a liquid-mix reservoir into a product freezing cylinder.
Figure 4:
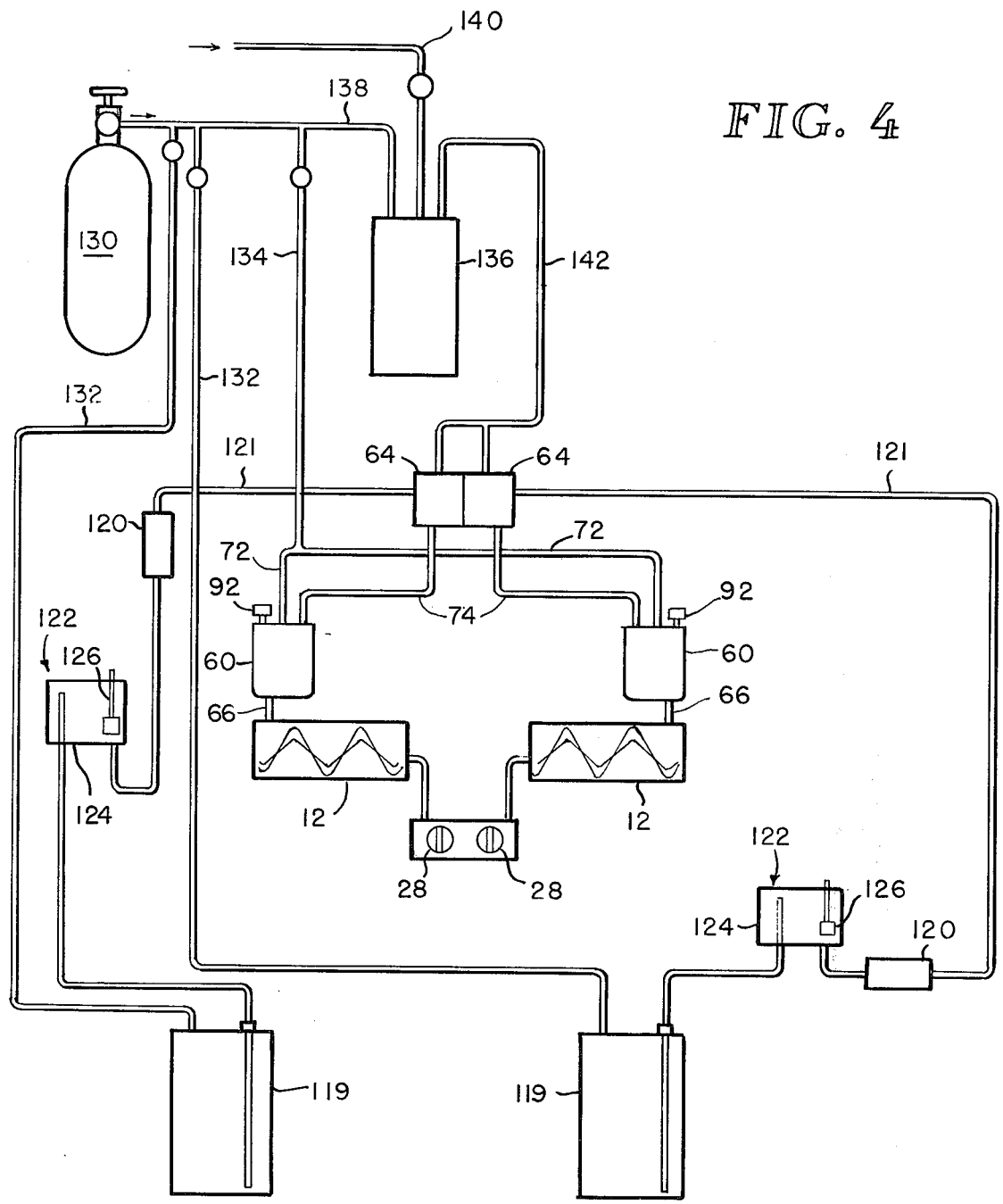
FIG. 4 is a functional schematic of the system of this invention.

Referring now to FIG. 4, in addition to the components detailed in FIGS. 1–3 each unit comprises a syrup temperature compensating valve 120 which regulates syrup flow from a syrup supply tank 119 through line 121 to the carbonated water-syrup dispensing assembly 64, and an out-of-syrup indicating and control assembly 122 placed in line 121 between tank 119 and valve 120. The out-of-syrup indicator comprises a closed vessel 124 having a syrup inlet opening into the upper portion of the vessel and a syrup outlet from the vessel bottom, and a float-actuated syrup level responsive switch assembly 126 similar to switch assembly 104 that is electrically connected into the control circuitry for the solenoid-operated valves 100. A $CO_2$ supply tank 130 is provided to pressurize syrup tanks 119–119 through lines 132–132, and reservoirs 60—60 through common line 134. $CO_2$ is also supplied from tank 130 to a carbonator 136 through line 138. Carbonator 136 is provided with a fresh water inlet line 140 and a carbonated water outlet line 142 leading to the carbonated water-syrup dispensing assemblies 64—64.

Referring now to FIG. 5, exemplary A.C. control circuitry for the double unit embodiment of this invention comprises for each unit, a refrigeration compressor 150 (including start and run capacitors 146 and 148), dasher motor 152, a master control switch 154, a product freezing cylinder temperature-actuated control switch 156, a starting relay 158, a shut off time delay relay 160, a refrigerant liquid line solenoid valve 162, and a product serve switch 164, all associated with the freezing and delivery of the frozen product. The circuitry also comprises for each unit an out-of-syrup indicator switch 126, an out-of-syrup warning light 127, a product mix reservoir level control switch 104, a reservoir level control switch connector 118, a triac static switch 170, carbonated water-syrup dispensing assembly solenoid valves 100, and an R-C network 172 associated with triac to compensate for an inductive load. The circuitry also includes a carbonator liquid level control switch 174 and a fresh water pump 176.

Referring now to FIGS. 4 and 5, an exemplary mode of operation for each unit of the system is as follows. The fresh water inlet pressure to the carbonator is adjusted to a level about 20 psig below the $CO_2$ carbonator input pressure, the latter typically being between about 80 and 120 psig. The $CO_2$ pressure to the product mix reservoir is adjusted to a range of between about 4 to 4.5 psig. With the syrup tank and carbonator full, carbonated water and syrup will be forced under pressure to the carbonated water-syrup dispensing assembly. The reservoir cover is removed and the metering valve removed to provide unrestricted mix access to the freezing cylinder. Reservoir level control switch connector 118 is then partially inserted into its socket thereby electrically bypassing the triac static switch to cause the dispensing solenoid valves 100 to open and feed the product mix into the reservoir from which it drains into the freezing cylinder. When the freezing cylinder has been filled to the desired level, usually not more than ¾ full, the reservoir control switch connector 118 is removed from its socket thereby inactuating the solenoid valves 100 to terminate product mix flow. The reservoir metering valve is re-inserted and the reservoir cover replaced. The master control switch is turned to the "on" position by closing the double pole-double through switch thereof thereby turning on the refrigeration compressor and the dasher motor for the duration required to turn the mix into a frozen slush product having a temperature of about 22°–24° F., upon the occurrence of which the dasher motor and refrigeration compressor will automatically cycle on and off under the control of the freezing cylinder temperature controller. The reservoir control switch connector 118 is fully inserted into its socket to connect the reservoir level switch 104 into the triac circuit for control of the solenoid valves 100 to automatically maintain the mix level within the reservoir between the limits of the float switch.

When a full charge of product mix has been added to the freezing cylinder and has been converted to a frozen slush, it will have expanded to substantially completely fill the cylinder and to bear against the screen 85 at the bottom of metering valve 62. Thus, product mix within the reservoir 60 will be blocked from entry into the freezing cylinder.

Screen 85 bars the frozen slush from entry into the metering valve 80 and into the reservoir.

To draw frozen product from the freezing cylinder, plunger valve 28 is opened and closes switch 164. Upon switch closure, the dasher motor operates to rotate the dasher and thus extrude frozen product through valve 28. The dasher helix forces all frozen product frontward and as product is withdrawn, the metering valve outlet will be cleared and pressurized product mix will pass through the metering valve into the rear end of the freezing cylinder. Typically, the refrigerant compressor will be turned on with the closure of switch 164 and thus the new product mix will begin to be frozen immediately upon entry into the freezing cylinder. As the newly added mix is frozen, the frozen slush will again contact the screen 85 and block further entry of mix from the reservoir. The metering valve metering orifice 84 is sized to prevent excessive entry of mix to the extent that the system refrigeration capacity would be overtaxed.

During periods of extended frozen product withdrawal, mix will be metered into the freezing cylinder relatively constantly. Consequently, mix expansion as it is converted to frozen slush will take place under sufficiently turbulent conditions that frozen slush would extrude back through the metering valve were it not for the presence of screen 85. If slush were to enter the reservoir 60, the sensitivity of float 108 to rising and falling reservoir liquid levels would be impaired to the extent that mix could overflow the reservoir.

When frozen product withdrawal is terminated, the time delay relay 160 will cause the dasher motor 152 and refrigeration compressor 150 to continue operation for a period sufficient to ensure that the newly added mix is fully converted to frozen slush before these components go back to the automatic cycling mode of operation.

As product mix is metered from the reservoir, the float 108 will fall with the reservoir liquid level until the switch 104 is actuated thereby causing the solenoid valves 100 to open to charge the reservoir with carbonated water and syrup. This mix will enter under turbulent conditions and excess pressure will be vented through the vent tube 76. When the reservoir liquid level rises to the point where float 108 opens switch 104, the solenoid valves 100 will close. Excess pressure will continue to vent until the reservoir pressure has reached the predetermined level of 4–4.5 psig at which point pressure relief head 92 will reseat to close off the vent tube 76. Because relief head 92 is releasably retained by the internal spring 94, excessive pressure cannot cause the relief head to become dislodged. And yet because of the relationship of the spring 94 to the needle 96, the spring 94 and relief head 92 can be removed for cleaning after the vessel cover 68 is removed.

If the system runs out of syrup, the normally-full out-of-syrup indicator vessel 124 will empty and the liquid level sensitive switch 126 therein will be actuated to interrupt the power to the solenoid valves 100. Consequently, no further mix addition to the reservoir will be possible until the syrup tank 119 is replenished. Actuation of switch 126 also causes a warning light 127 to go on to indicate the out-of-syrup condition.

If the carbonated water level in carbonator 136 falls below a predetermined level, a level sensitive switch 174 therein will be actuated to cause the addition of fresh water thereinto. The fresh water will be charged turbulently with a concommitantly rapid dissolving of $CO_2$ therein to form carbonated water. When the carbonator is refilled, the switch 174 will be inactuated thereby terminating fresh water input.

The components of the system are designed for in-place cleaning. This is accomplished by replacing the syrup tanks with detergent and rinse solution-containing tanks. The $CO_2$ pressure will force these solutions through all lines and vessels under sufficient pressure to cleanse these components as the control valves and switches are actuated as though the freezing cylinders were being initially filled with product mix. To clean each freezing cylinder, the single throwsingle pole switch of each master switch 154 is closed to operate the dasher motor 152, without operation of the refrigeration compressor 150, after the desired amount of cleaning liquid has been charged thereinto from the mix reservoir.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed is defined as follows:

1. A frozen carbonated drink dispensing apparatus which comprises product freezing and dispensing means comprising a freezing cylinder pressure vessel and a frozen product dispensing valve communicating with said cylinder; and liquid mix supply means comprising a carbonated liquid mix reservoir pressure vessel, a mix entry tube extending between said reservoir and said freezing cylinder; means enabling said reservoir to be pressurized with $CO_2$ to a predetermined pressure level, a carbonated liquid mix valve in said tube communicating with said reservoir and with said cylinder for feeding liquid product under pressure from said reservoir into said cylinder according to the quantity of water and syrup in said freezing cylinder, and a carbonated water and syrup dispensing assembly communicating with said reservoir for charging said reservoir with proportioned quantities of carbonated water and syrup, said mix valve comprising a tubular valve sleeve removably positioned in said tube and opening into said freezing cylinder and communicating with the reservoir interior through a metering port, and a screened frozen product barrier removably fitted to the lower end of said sleeve to inhibit entry of frozen slush into said reservoir.

2. A frozen carbonated drink dispensing apparatus which comprises product freezing and dispensing means including a horizontal product freezing cylinder, means within said freezing cylinder for advancing frozen product toward the forward end of said freezing cylinder, and frozen product dispensing means for dispensing frozen product from the forward end of said freezing cylinder; liquid mix supply means including a carbonated liquid mix reservoir, a mix entry tube connecting said reservoir to the rearward end of said freezing cylinder, a liquid mix metering valve disposed within said entry tube comprising a hollow valve sleeve opening into said freezing cylinder and communicating with the reservoir interior through a metering port, a screened frozen product barrier fitted to the lower end of said sleeve to inhibit entry of frozen product into said reservoir, and means for pressurizing said reservoir with $CO_2$ and for maintaining pressure within said reservoir at a predetermined level; and a carbonated water and syrup dispensing assembly including valve means for charging said reservoir with proportioned quantities of carbonated water and syrup, liquid level sensitive means for controlling said valve means responsive to liquid level changes in said reservoir, means for supplying carbonated water to said dispensing assembly, means for supplying syrup to said dispensing assembly, and means for inactivating said valve means when the syrup supply is exhausted.

3. In a frozen concentrated drink dispensing apparatus having a freezing cylinder and a reservoir pressurized by $CO_2$ containing a mixture of carbonated water and syrup in communication with said cylinder, the improvement comprising valve means for regulating the flow of mixture from said reservoir into said cylinder and controlled by the quantity of mixture contained within said cylinder, said valve means comprising:

a tube having its upper end extending into said reservoir to a level above said mixture and having an open bottom communicating with said cylinder;

a metering port in the portion of said tube located within the mixture in said reservoir; and a screen covering the open bottom of said tube.

4. The apparatus of claim 3 wherein said dispensing apparatus includes a liquid level sensitive switch means disposed within said reservoir, and carbonated water-syrup dispensing valve means electrically connected to said switch means and adapted to dispense proportioned carbonated water-syrup mix into said reservoir to maintain the mix level therein between upper and lower limits responsive to the action of said switch means, said upper limit being below the upper end of said tube and said lower limit being no lower than the level of said metering port.

5. Dispensing apparatus according to claim 3 in which said metering port is located adjacent the bottom of said reservoir.

6. Dispensing apparatus according to claim 3 in which said freezing cylinder and reservoir are interconnected by a straight passageway and said tube is removably mounted in said passageway.

7. Dispensing apparatus according to claim 6 in which said screen is removably mounted on said tube.

* * * * *